United States Patent [19]

Baker

[11] Patent Number: 5,226,209
[45] Date of Patent: Jul. 13, 1993

[54] METHOD FOR PROCESSING COMPOSITE WATER PUMP SEAL RING

[75] Inventor: Steven F. Baker, Bellevue, Ohio

[73] Assignee: General Motors Corporation, Detroit, Mich.

[21] Appl. No.: 732,361

[22] Filed: Jul. 18, 1991

[51] Int. Cl.⁵ .............................................. B21K 1/00
[52] U.S. Cl. .................................... 29/404; 29/888.3; 264/162; 264/237; 264/343; 264/348
[58] Field of Search .................. 29/404, 888.3, 446; 264/162, 237, 343, 348

[56] References Cited

U.S. PATENT DOCUMENTS

| | | |
|---|---|---|
| 3,108,370 | 10/1963 | Peickii et al. ............... 29/404 X |
| 3,275,729 | 9/1966 | Pohlman ..................... 264/162 |
| 3,774,277 | 11/1973 | Bentley-Leek ............... 29/404 X |
| 3,969,451 | 7/1976 | Floyd et al. ................. 264/162 X |
| 4,250,606 | 2/1981 | Korenaga ................... 29/404 X |
| 4,512,115 | 4/1985 | Miller ....................... 29/404 X |

Primary Examiner—Joseph M. Gorski
Attorney, Agent, or Firm—Patrick M. Griffin

[57] ABSTRACT

A composite seal ring has a porous main body and a non-porous insert molded into it. Differential rates of coolant absorption between the porous main body and non-porous insert cause the whole ring to swell into a regular pattern of distortion. In order to compensate, the seal ring, after initial machining, is pre-soaked to simulate use and deliberately cause the same kind of distortion. It is then lapped flat from its distorted state.

1 Claim, 3 Drawing Sheets

METHOD FOR PROCESSING COMPOSITE WATER PUMP SEAL RING

This invention relates to vehicle water pump face seals in general, and specifically to a method for processing a composite seal ring so as to eliminate the distortion problem caused by differential rates of coolant adsorption by the various parts of the seal ring.

BACKGROUND OF THE INVENTION

Vehicle coolant pumps, generally referred to as water pumps, incorporate a spring loaded face seal that sees very high temperatures, speeds and sealing forces, and which is consequently highly prone to wear if it is out of tolerance or distorted in any way. A common type of face seal has one sealing ring that is a single piece of bronze, ceramic or other wear and heat resistant material, which can be lapped very flat. It is contacted by another sealing ring, under a high spring force, at an interface that constitutes a primary barrier to coolant linkage. For that interface to stay tight, the mated faces must be, and must remain, substantially flat. To reduce wear, it is common to make one of the sealing rings as a composite structure with a main body that is a graphite and phenolic resin mix. An annular bronze insert is molded into the main body, concentric therewith. When the composite sealing ring is machined flat, the result is a sealing face that has two concentric annular areas, an outer annulus of bronze and an adjacent inner annulus of the graphite resin mix. The bronze provides toughness and high wear resistance. The molded graphite and resin body holds the insert and acts to continually leach some of its graphite onto and into the sealing interface, lubricating and reducing wear. The combination of qualities provided is very beneficial.

The composite structure also causes a problem, however. In order to facilitate the bond between the molded main body and the bronze insert, the bronze insert has a series of evenly circumferentially spaced teeth and slots cut into it. The molded phenolic mix flows in and around the slots, creating a strong adhesion. It was discovered that in-use, the graphite phenolic mix, which is porous, was absorbing the ethylene glycol and water coolant, causing it to swell. The non-porous bronze absorbed essentially none. The differential absorption and swelling was translated by the slots and teeth into a regular, almost sinusoidal peak and valley pattern of distortion on the face of the sealing ring. Though slight, even a slight distortion can lead to lessened seal life. While incipient leakage is not severe, and the seals can be easily replaced before there is a real problem, longer lasting parts are always desirable.

SUMMARY OF THE INVENTION

The invention provides a method for processing the type of seal ring described above that eliminates the in-use distortion caused by differential coolant absorption. The general thrust of the method is to simulate the distortion before the sealing ring is used, and to compensate for it in the manufacturing process.

Specifically, the bronze insert is molded into the main body, and the face is initially machined flat, as is normally done. Then, the primary ring is soaked in a heated bath of the same type of coolant that it will experience in-use. This is done long enough to cause the same type of differential absorption surface deformation that would occur in-use. Then, while the part is still distorted, it is lapped flat again. The seal ring is then installed into the seal assembly. The seal assembly may be installed in the pump soon after, or stored. If stored, then the ring may dry out with time, and actually distort slightly in the other direction. But, in either event the seal face will flatten and remain flat in-use.

It is, therefore, a general object of the invention to provide a method for processing a composite sealing ring that compensates for differential absorption related distortion.

It is another object of the invention to initially process the sealing ring as usual, and then simulate the in-use distortion so that the distorted sealing ring can be re processed in its distorted state.

It is another object of the invention to pre distort the sealing ring by soaking it in the same type of solution that it would see in actual use, long enough to cause the distortion, and then lap the distorted surface flat, so that it will remain flat in-use.

DESCRIPTION OF THE PREFERRED EMBODIMENT

These and other objects and features of the invention will appear from the following written description, and from the drawings, in which.

Figure 1:
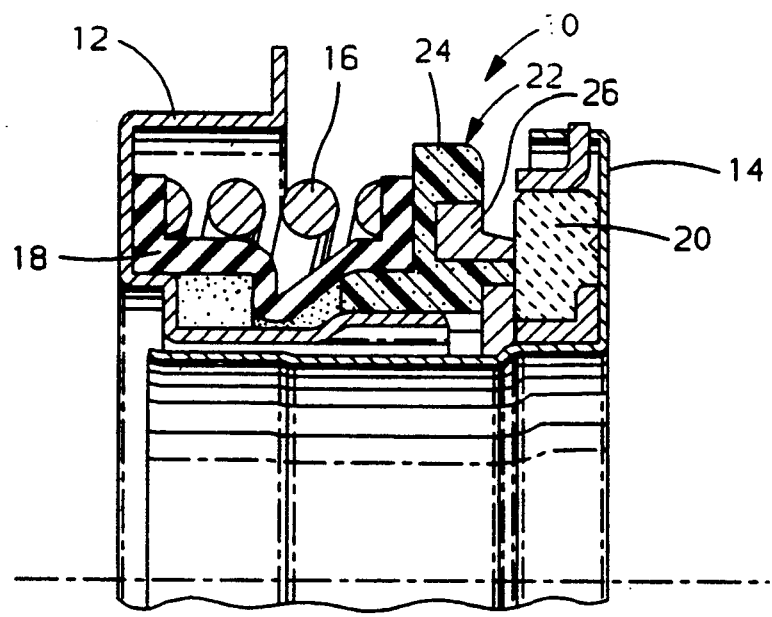
FIG. 1 is a cross section of a vehicle water pump face seal assembly incorporating a composite sealing ring made according to the method of the invention.

Referring first to FIG. 1, a vehicle water pump face seal assembly, indicated generally at 10, has a pair of nested, stamped metal casings 12 and 14 and a compressed spring 16. Casing 14 is installed over a pump shaft and abuts a pump impeller, spinning therewith. Casing 12 is installed in an opening in a pump housing, and is stationary. Coolant is retained by stationary bellows 18, and by a dynamic sealing interface between two seal rings. These are a rotating seal ring 20 carried by casing 14, and a stationary composite seal ring, indicated generally at 22, carried by casing 12. Seal ring 20 is a simple annular ring, formed of ceramic, which is tough, durable, and not particularly subject to coolant absorption.

Figure 2:
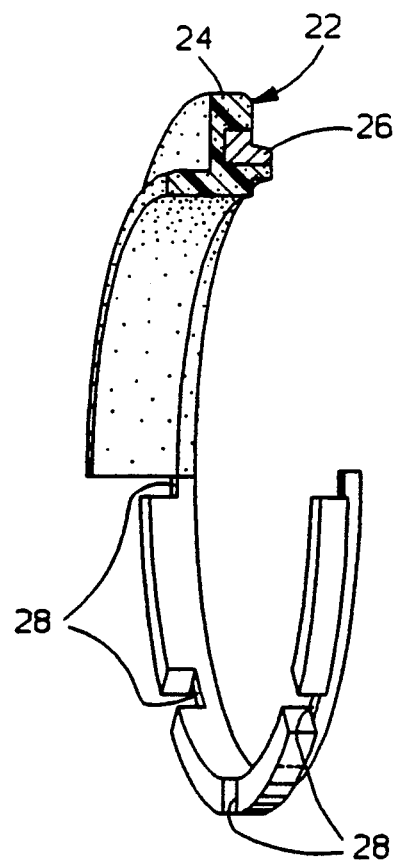
FIG. 2 is a perspective of the composite sealing ring cross sectioned and partially broken away so as to reveal details of the bronze insert.

Referring next to FIG. 2, the details of seal ring 22 are illustrated. Seal ring 22 is a composite structure, with a molded main body 24 in which is embedded a bronze insert 26. The main body 24 is molded from a mix of 80 percent graphite power and 20 percent phenolic resin. The bronze insert 26 is generally annular and L-shaped in cross section, but has eight evenly spaced notches 28 machined into its back edge. The notches 28 create voids into which the material of the main body 24 flows during the molding process, creating a secure, non-slip bond therebetween. After molding, when the face of the composite seal ring 22 is machined flat, two concentric annular areas are created, one of bronze and one of the graphite-phenolic mix. This is an advantageous combination, as the bronze insert 26 provides good wear resistance and can be machined very flat, while the adjacent main body 24 is tough, durable, corrosion proof and continually leaches lubricating graphite into the interface with the other sealing ring 20.

Figure 4:
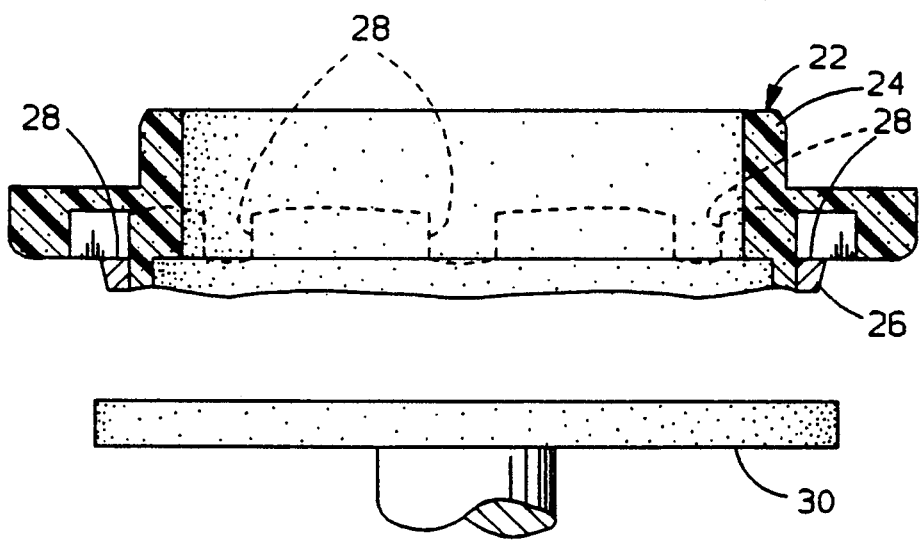
FIG. 4 is a cross section of the sealing ring in its deliberately distorted state, prior to being lapped flat.
Figure 5:
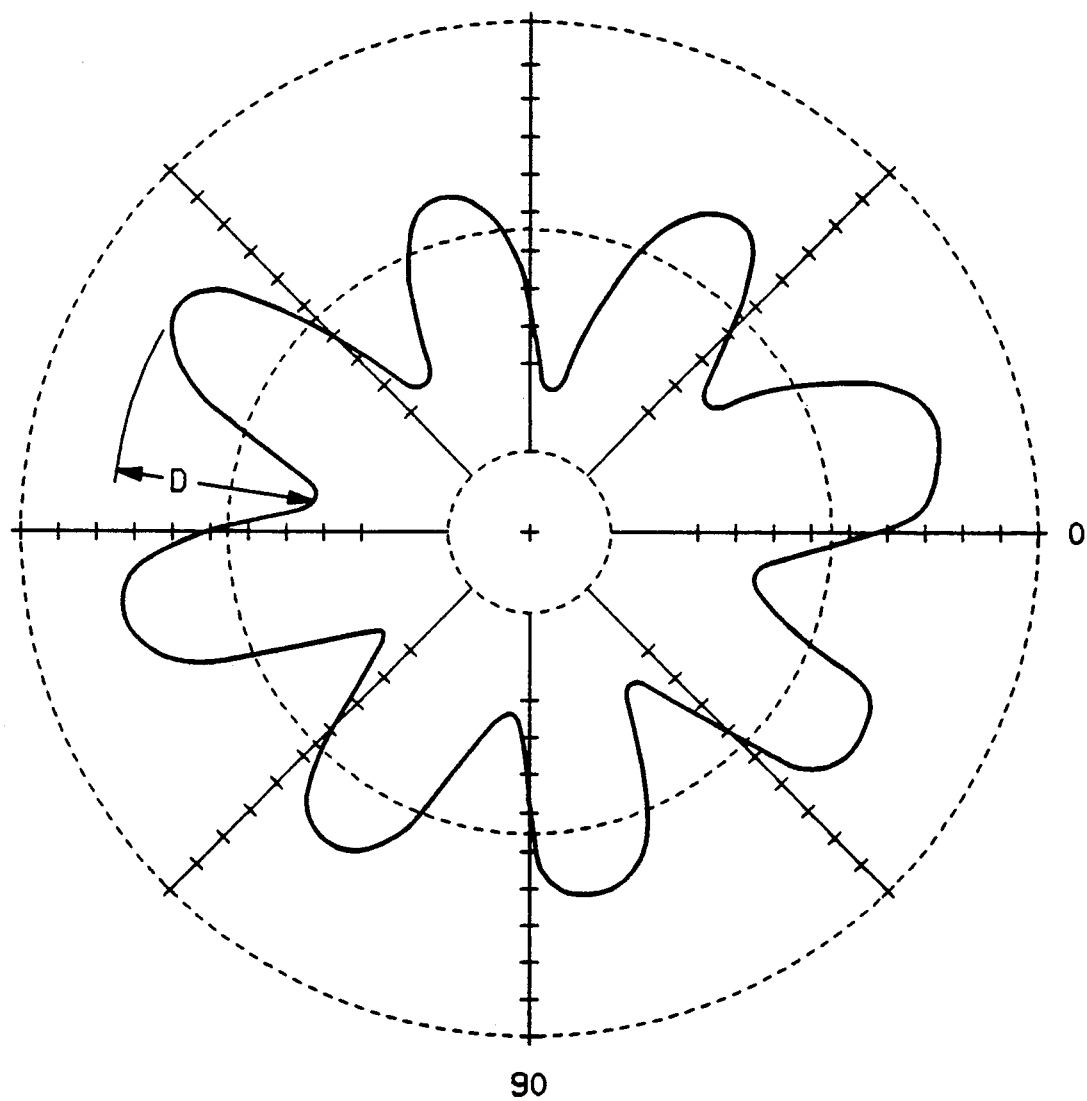
FIG. 5 is a plot of the profile of the actual surface of the pre-distorted part.

Referring next to FIGS. 4 and 5, a disadvantage of the composite structure of ring 22 was also discovered. The mixture of which main body 24 is molded is porous by nature. When exposed to the hot coolant in operation, some of the coolant, which includes ethylene glycol, is absorbed in the pores, causing main body 24 to swell. Bronze insert 26 is extremely non-porous, and does not absorb any coolant. It acts instead like a reinforcing skeleton to resist the swelling of the ring 22 as a whole. But, because of the presence of the notches 28, that resistance to swelling is not uniform. As a result, the whole ring 22, especially the machined face thereof, ends up distorted into a peak and valley configuration of high and low spots. The presence of the eight regularly spaced notches 28 is reflected in eight regularly spaced high spots in the face of ring 22, a so-called eight node configuration. The degree of distortion is deliberately exaggerated in FIG. 4. However, FIG. 5 does represent an actual plot of the surface, and it is clearly quite regular. The total peak to valley differential D can be as much as 40 micro inches or more, which cannot be seen by eye, but is still significant in terms of wear.

Figure 3:
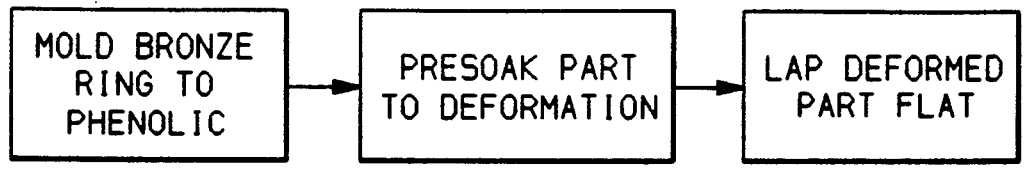
FIG. 3 is a flow chart summarizing the general steps of the method.
Figure 6:
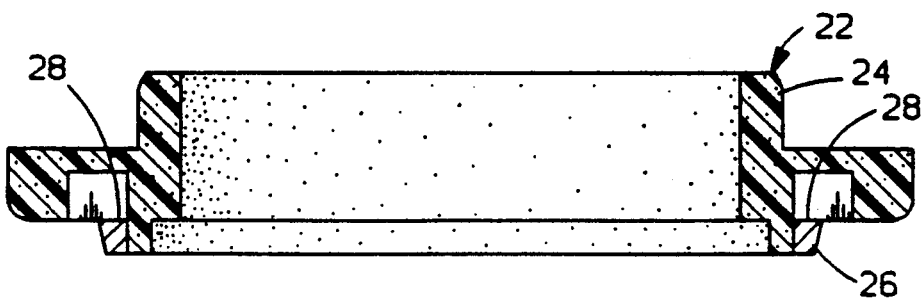
FIG. 6 shows the sealing ring after being finally lapped flat.

Referring next to FIGS. 3, 4 and 6, the steps of the process that was developed to compensate are illustrated. After seal ring 22 has been molded and initially machined flat, it is soaked in a solution that closely matches the coolant it will see in operation, and under similar conditions. Specifically, the ring 22 is boiled in a half and half mixture of water and ethylene glycol (antifreeze) at a range of 225-230 degrees F. for approximately seventy-two hours. This is sufficient time for the ring 22 to thoroughly absorb the coolant mixture and swell to the condition shown in FIG. 4. Ring 22 is then quickly water quenched to near room temperature so that it can be easily handled. Next, the deliberately distorted ring 22 is lapped flat by a conventional lapping wheel 30. The peaks, low though they may be, are removed in the lapping process, leaving ring 22 suitably flat again, as shown in FIG. 6. Flatness of the finished ring 22 is within a ten to twenty micro inch range. After being so processed, ring 22 is assembled into the seal assembly 10 as usual, at which point it may be soon installed in a water pump. In-use, the composite ring 22 will be continually exposed to hot coolant, and will maintain its flat condition. The seal assembly 10 may be shelved for a while, instead of being immediately installed. If shelved long enough, ring 22 may actually dry out, though proper packaging would likely delay it. If dried out sufficiently, ring 22 could distort the other way, with valleys where there were high spots. In-use, however, the dried ring 22 would quickly reabsorb coolant, and turn back to its flat condition.

Variations in the ranges and temperatures disclosed could be made. Study has shown that it is likely the water component of the soak mix which is the main element actually absorbed by the seal ring 22. Therefore, a soak mix with a much lower proportion of glycol and more water could work. However, it has been determined that the ethylene glycol that is absorbed from the 50-50 mixture helps retard drying out of the processed seal ring, which would be an advantage if it is likely to be shelved a long time before installation. Other soak times could be used to take ring 22 to its pre distorted condition, and seventy-two hours likely represents the high end of the range. However, long soak times should not present a productivity disadvantage if the rings are processed in large quantities. The important factor is to soak long enough to substantially saturate the main body 24 and create the same level of distortion seen in actual use. Therefore, it will be understood that it is not intended to limit the invention to just the embodiment disclosed.

The embodiments of the invention in which an exclusive property or privilege is claimed are defined as follows:

1. A method for processing a vehicle coolant water pump face seal assembly sealing ring of the composite type having a porous molded main body and a non-porous insert embedded therein, and which is subject to deformation in-use due to the differential absorption of coolant by said porous main body and non-porous insert, comprising the steps of, molding said non-porous insert into said porous main body, thereby creating said sealing ring, initially machining said sealing ring, thereby creating a substantially flat face, pre-soaking said sealing ring in a mixture approximating said coolant, thereby simulating use and deliberately causing said initially flat face to distort due to differential absorption of said mixture by said porous main body and said non-porous insert, and, lapping said deliberately distorted face flat while said mixture is still absorbed in said sealing ring.

* * * * *